Haven & Hettrich,
Whirligig,

№ 59,745. Patented Nov. 20, 1866.

Witnesses:
Frank Millward
James H. Layman

Inventor:
James L. Haven
Charles Hettrich
By Knight Bros
Attys.

United States Patent Office.

BANDELORE.

JAMES L. HAVEN AND CHARLES HETTRICK, OF CINCINNATI, OHIO.

Letters Patent No. 59,745, dated November 20, 1866.

SPECIFICATION.

TO ALL WHOM IT MAY CONCERN:

Be it known that we, JAMES L. HAVEN and CHARLES HETTRICK, both of Cincinnati, Hamilton county, Ohio, have invented a new and useful bandelore, and we do hereby declare the following to be a full, clear, and exact description thereof, reference being had to the accompanying drawings making part of this specification.

Our invention is an improved construction of the toy, commonly called a bandelore, and consists in forming the same of two disks of metal, coupled together at their centers by means of a clutch and rivet in the manner following.

Figure 2:
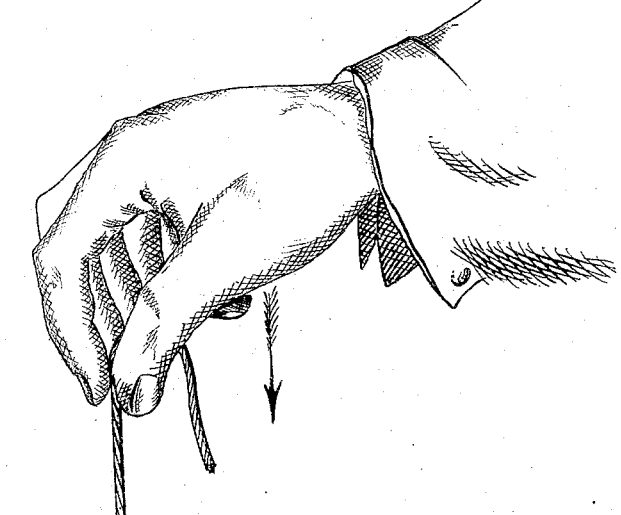
Fig. 2 is an axial section through the same.
Figure 2:
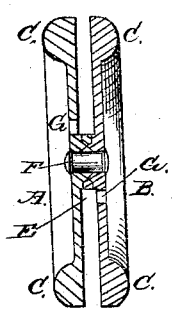
Figure 3:
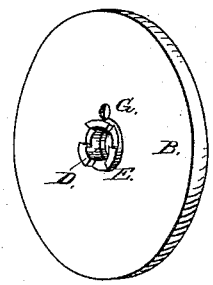
Fig. 3 is an inner side view of one of the component disks.
Figure 1:
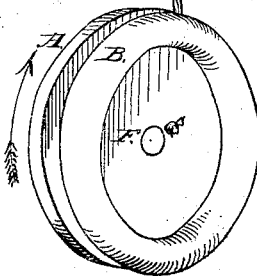
Fig. 1 is a perspective view of a bandelore embodying our improvements.

A, B, represent two similar circular plates or disks, having on their outer sides a marginal rim or swell C and having a central aperture D, surrounded on the inner side of each disk by an indented annular boss E, the indentations of one boss being adapted to receive the projections of the other boss, so as to interlock firmly together on the principle of a clutch on the insertion and clenching of a rivet F.

One or both disks are provided just outside of the boss with a small hole G, to secure the string H, by which the instrument is operated.

By means of the above construction we are enabled to make the bandelore of metal, and thus secure in high degree the momentum which is essential to easy operation of the toy.

It will be observed that the marginal swell C, exercises the function of a fly-wheel.

We have selected for illustration the form actually manufactured by us, but the device is susceptible of various modifications—for example, the web or central portion may be of ornamental open work and various devices may be employed in the conformation of both the web and the exterior rim, and the rivet may be replaced by a screw.

We claim herein as new and of our invention—

The disks A, B, united at their centres by the rivet F, and interlocking bosses E, substantially as set forth

JAMES L. HAVEN,
CHARLES HETTRICK.

Witnesses:
GEO. H. KNIGHT,
JAMES H. LAYMAN.